US005216595A

United States Patent [19]

Protheroe

[11] Patent Number: 5,216,595

[45] Date of Patent: Jun. 1, 1993

[54] SYSTEM AND METHOD FOR INTEGRATION OF LOTTERY TERMINALS INTO POINT OF SALE SYSTEMS

[75] Inventor: Robert L. Protheroe, Cambridge, Ohio

[73] Assignee: NCR Corporation, Dayton, Ohio

[21] Appl. No.: 495,978

[22] Filed: Mar. 20, 1990

[51] Int. Cl.$^5$ .................. G06F 15/28; H63B 71/00

[52] U.S. Cl. .................. 364/412; 273/138 A

[58] Field of Search .................. 364/412, 405, 404; 273/138 A, 139, 269

[56] References Cited

U.S. PATENT DOCUMENTS

| | | | |
|---|---|---|---|
| 4,108,361 | 8/1978 | Krause | 235/375 |
| 4,323,770 | 4/1982 | Dieulot et al. | 235/375 |
| 4,494,197 | 1/1985 | Troy et al. | 364/412 |
| 4,669,730 | 6/1987 | Small | 273/138 A |
| 4,677,553 | 6/1987 | Roberts et al. | 364/412 |
| 4,689,742 | 8/1987 | Troy et al. | 364/412 |
| 4,760,247 | 7/1988 | Keane et al. | 235/454 |
| 4,815,741 | 3/1989 | Small | 273/138 A |
| 4,839,507 | 6/1989 | May | 235/381 |
| 4,854,590 | 8/1989 | Jolliff et al. | 273/138 A |
| 4,859,838 | 8/1989 | Okiharu | 364/404 |
| 4,882,473 | 11/1989 | Bergeron et al. | 235/380 |
| 4,922,522 | 5/1990 | Scanlon | 364/412 |
| 4,937,853 | 6/1990 | Brule et al. | 364/412 |
| 4,982,337 | 1/1991 | Burr et al. | 364/479 |
| 5,119,295 | 6/1992 | Kapur | 364/412 |

*Primary Examiner*—Roy N. Envall, Jr.
*Assistant Examiner*—Xuong Chung
*Attorney, Agent, or Firm*—Albert L. Sessler, Jr.

[57] ABSTRACT

In a system for performing both lottery ticket transactions and merchandise sales transactions and maintaining a record of both, a group of lottery terminals are coupled to a lottery central processing center. A POS (point of sale) terminal and a bar code scanner are coupled to each lottery terminal. The lottery terminal can pass through information from the bar code scanner to the POS terminal through a scanner interface of the POS terminal using a predetermined scanner data format and can also transmit lottery ticket information to the POS terminal using a similar data format. A group of POS terminals are coupled to an in-store processor to enable both lottery and merchandise data to be recognized and recorded.

20 Claims, 6 Drawing Sheets

SYSTEM AND METHOD FOR INTEGRATION OF LOTTERY TERMINALS INTO POINT OF SALE SYSTEMS

Background of the Invention

Various states of the United States are utilizing state lotteries as a means for increasing their revenue and decreasing the need for new taxes. Such lotteries are heavily advertised and lottery ticket sales are made in large numbers of retail establishments, from large supermarkets to small convenience stores. Participation in a lottery drawing most commonly includes the purchase of a lottery ticket, which includes a unique number or other data that provides evidence for a claim for a winning selection.

Many different types of games may be played in a typical lottery system. As an example, one of the most popular is "auto lotto", in which the lottery machine or terminal, rather than the customer, selects the unique number. There is often a set price per ticket, and the customer selects the number of plays of that number on successive days.

In order to enhance "impulse" purchasing of lottery tickets, it is advantageous to locate lottery terminals next to the POS (point of sale) terminals in a retail establishment, so that the customer will be provided with an opportunity to purchase one or more lottery tickets while checking out his or her merchandise purchases. For cash control and accounting purposes, it would be helpful to be able to record the purchase of lottery tickets at an associated POS terminal used for handling merchandise transactions, with the record of lottery ticket purchases being stored in an in-store processor used with the POS terminals.

Summary of the Invention

In the present invention, a system and a method are provided for integration of lottery terminals into point of sale systems to enable lottery ticket transactions to be handled by the operator of a point of sale terminal and to enable a record of lottery ticket purchases to be included with the record of merchandise transactions recorded by the point of sale terminal.

In accordance with one embodiment of the invention, a system for performing both lottery ticket transactions and merchandise transactions and for maintaining a record of all such transactions comprises: a plurality of lottery terminals; a plurality of POS terminals for registering both lottery ticket transactions and merchandise transactions, each coupled to a lottery terminal for receiving data from said lottery terminal; a lottery controller coupled to all of said lottery terminals; and a plurality of scanners, each coupled to a lottery terminal for providing merchandise data to an associated POS terminal through the lottery terminal to which it is coupled, a transaction processor coupled to all of said POS terminals.

In accordance with another embodiment of the invention, a method for performing lottery ticket transactions and merchandise transactions and utilizing a lottery terminal, a lottery controller, a POS terminal and a scanner for scanning coded merchandise symbols and for maintaining a combined record of both types of transactions, comprises the following steps: making a determination by the lottery terminal as to whether or not coded merchandise symbol data is available to be received; if so, reading the coded merchandise data from the scanner and transmitting the data to the POS terminal; making a determination by the lottery terminal as to whether or not a lottery sales request has been made to the lottery terminal; if so, sending a lottery ticket request to the lottery controller; receiving a lottery ticket acknowledgment by the lottery terminal from the lottery controller; transmitting data representing a lottery ticket sale to the POS terminal; and printing the lottery ticket representing such lottery ticket sale by said lottery terminal.

It is accordingly an object of the present invention to provide a system for performing both lottery ticket transactions and merchandise sale transactions.

Another object is to provide a combined lottery ticket and merchandise transaction system which includes a combination of lottery terminals, point of sale terminals, scanners, lottery controllers, transaction processors and a lottery central processing center.

Another object is to provide a method for performing both lottery ticket transactions and merchandise sale transactions and maintaining a common record of such transactions.

Another object is to provide a system and method for the combination of a lottery system with a point of sale system.

Another object is to provide a system and method for the association of lottery terminals with point of sale terminals in which information relating to both lottery transactions and merchandise transactions is provided to point of sale terminals in a similar data format.

With these and other objects, which will become apparent from the following description, in view, the invention includes certain novel features and combinations of parts, a preferred form or embodiment of which is hereinafter described with reference to the drawings which accompany and form a part of this specification.

DETAILED DESCRIPTION

In existing POS (point of sale) systems, input of UPC or other product code information may be provided to a POS terminal from a scanner, such as a bar code scanner, through an interface in the POS terminal. This information then may be transmitted from the POS terminal to an in-store or transaction processor which uses the product code number reference from the POS terminal to access an item file which will provide both the price of the item and a text for display on the POS terminal to describe the merchandise bearing the code. The in-store or transaction processor will also maintain records concerning the item for which the product code was read, such as an audit trail to keep count of the number of such items sold.

Figure 6:
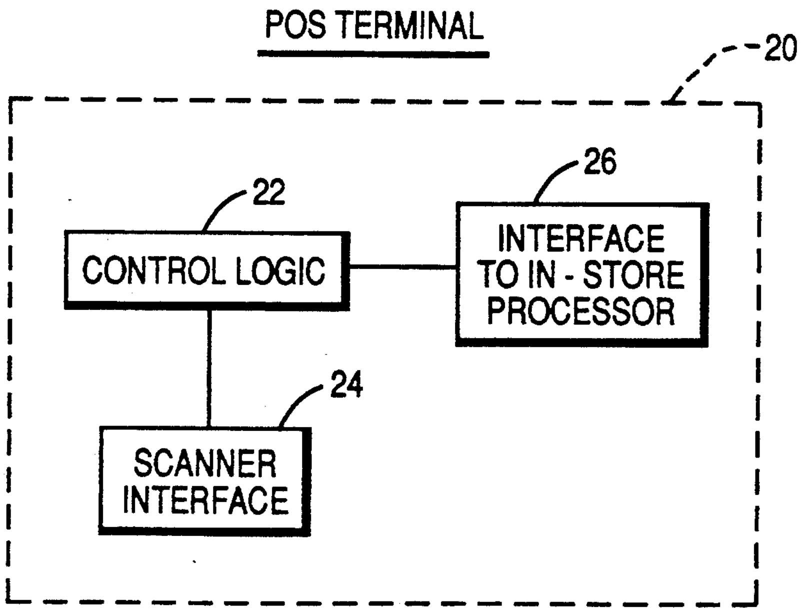
FIG. 6 is a functional block diagram of a POS terminal.

Shown in FIG. 6 is a block diagram of a POS terminal 20, which diagram includes the key elements of the terminal required for use in the present invention. A number of such terminals are currently available, such as the NCR 2557, marketed by NCR Corporation, Dayton, Ohio. Control logic 22 is coupled to a scanner interface 24 for receiving information from a scanner such as a bar code scanner capable of reading product code information from merchandise tags associated with merchandise being purchased. The control logic 22 is also coupled to an interface 26 for coupling said terminal to an in-store or transaction processor, to which the product code information is sent to obtain item and price information that is then returned to the POS terminal.

Figure 4:
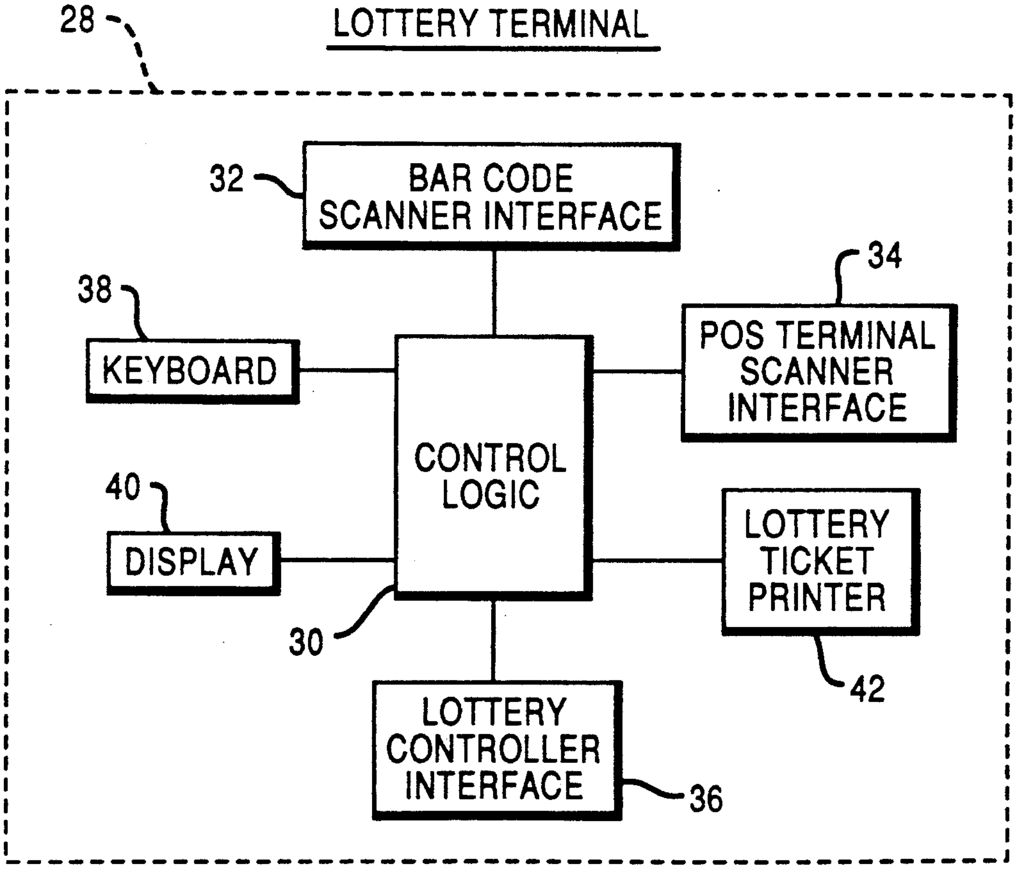
FIG. 4 is a functional block diagram of a lottery terminal.

In accordance with the present invention, a plurality of lottery terminals may be included in a point of sale system, such as described above. Shown in FIG. 4 is a block diagram of a lottery terminal 28, which diagram includes the key elements required for use in the present invention. Control logic 30 within the terminal 28 controls a bar code scanner interface 32, a POS terminal scanner interface 34, and a lottery controller interface 36. In addition, the control logic also controls a keyboard 38, a display 40 and a lottery ticket printer 42, all of which are used in interaction with a customer's purchase of a lottery ticket.

Figure 5:
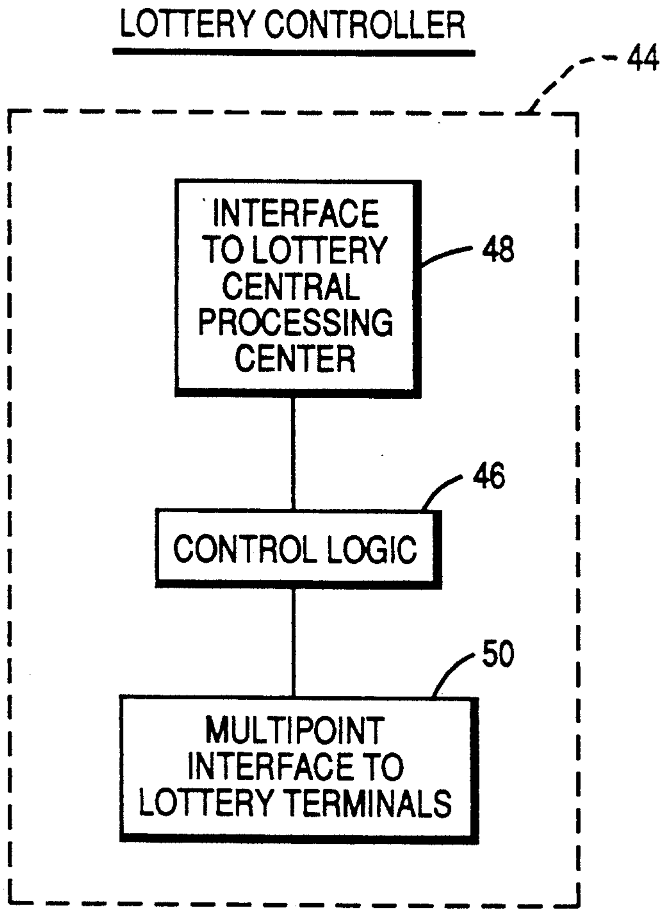
FIG. 5 is a functional block diagram of a lottery controller.

One or more lottery terminals may be coupled to a lottery controller 44, such as is shown in the block diagram of FIG. 5, which includes the key elements of the lottery controller that are required for use in the present invention. Control logic 46 is coupled to an interface 48 to the lottery central processing center, and to a multipoint interface 50 to the lottery terminals. The lottery controller 44 would normally be used in a multiple lottery terminal environment, in which the interface 50 would be coupled to more than one lottery terminal, but could also be used in an environment in which the interface 50 is coupled to only one lottery terminal 28. The lottery controller 44 is customarily located at the same site as the lottery terminals to which it is coupled, while the lottery processing station is normally remotely situated at a central location. The lottery controller concentrates communications from a number of lottery terminals for transmission to and from a central processing center, so that only one communications line is required from the terminals at a site to the central unit. The lottery controller polls each lottery terminal in turn to determine whether they have messages to send to the central processing unit. Thus the main functions of the lottery controller are communications and interfacing, and it handles such chores as protocol conversion and message reformatting. Since different lottery systems may be employed, for example in different states, the lottery controller becomes a convenient location to handle differences in lottery schemes. This minimizes the need for changes in the central processing center and in the individual lottery terminals when the same basic equipment is being manufactured for use in different locations and systems. An NCR Tower 500 mainframe computer, marketed by NCR Corporation, Dayton, Ohio, can be configured to function as a lottery controller. The NCR Multi-Protocol Communications Adaptor Board, part no. 3476-K152, when installed in the Tower computer, provides X.25 communications for communicating to the lottery central processing center. The NCR RS-232/RS-422 Signal Converter, part no. 1440-CO14-9999, when connected to the Tower computer RS-232 serial port, provides the multipoint link to communicate to the lottery terminals.

In operation of the lottery system, a customer will customarily approach the lottery terminal and actuate the keyboard to request a ticket. The lottery terminal then communicates the request for a ticket to the lottery controller, which passes the request to the lottery central processing center within the lottery system. The central processing center assigns a serial number to the transaction for tracking purposes with respect to claims for winnings. This serial number is returned as part of an acknowledgement message which is transmitted from the central processing center back through the lottery controller to the lottery terminal. At this time, the lottery terminal is authorized to print the lottery ticket, and issue the ticket to the customer.

Figure 1:
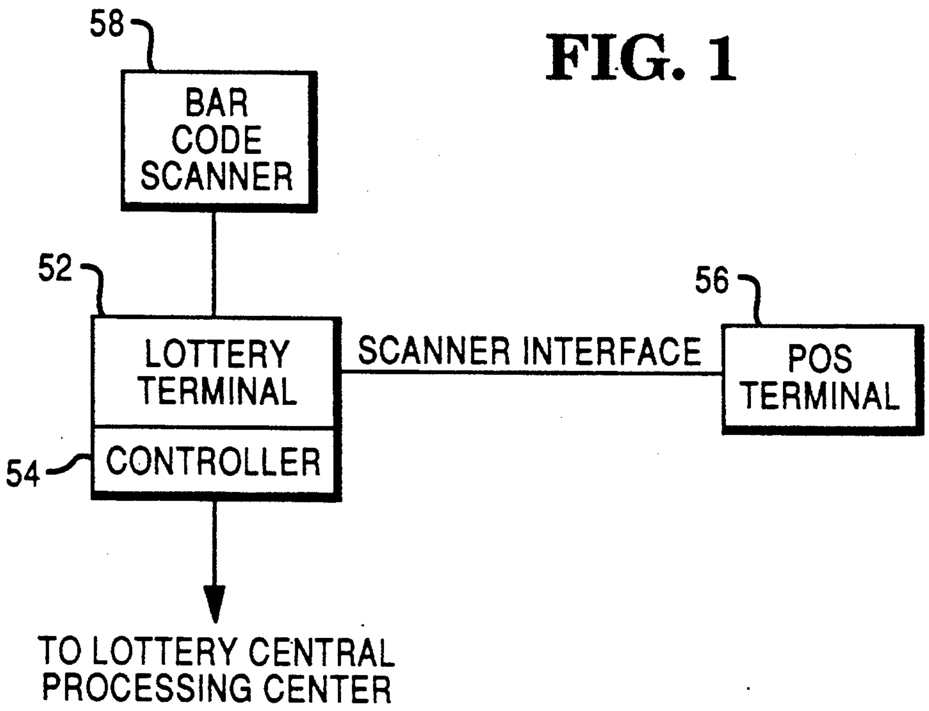
FIG. 1 is a block diagram showing the relationship between a lottery terminal with attached lottery controller, a bar code scanner, a POS terminal and a lottery central processing center.

Shown in FIG. 1 is a simple arrangement of a lottery terminal 52, having an integral lottery controller 54, with a POS terminal 56 and a bar code scanner 58. The bar code scanner 58 is coupled to the bar code interface of the lottery terminal 52 rather than to the scanner interface of the POS terminal 56. The lottery terminal 52 can either act as a passthrough to the POS terminal 56 for bar code scanner data originating from the scanner 58, or it can originate data relating to lottery ticket sales and transmit that data in a format which is similar to that used for transmitting data from the scanner to the POS terminal 56.

Figure 2:
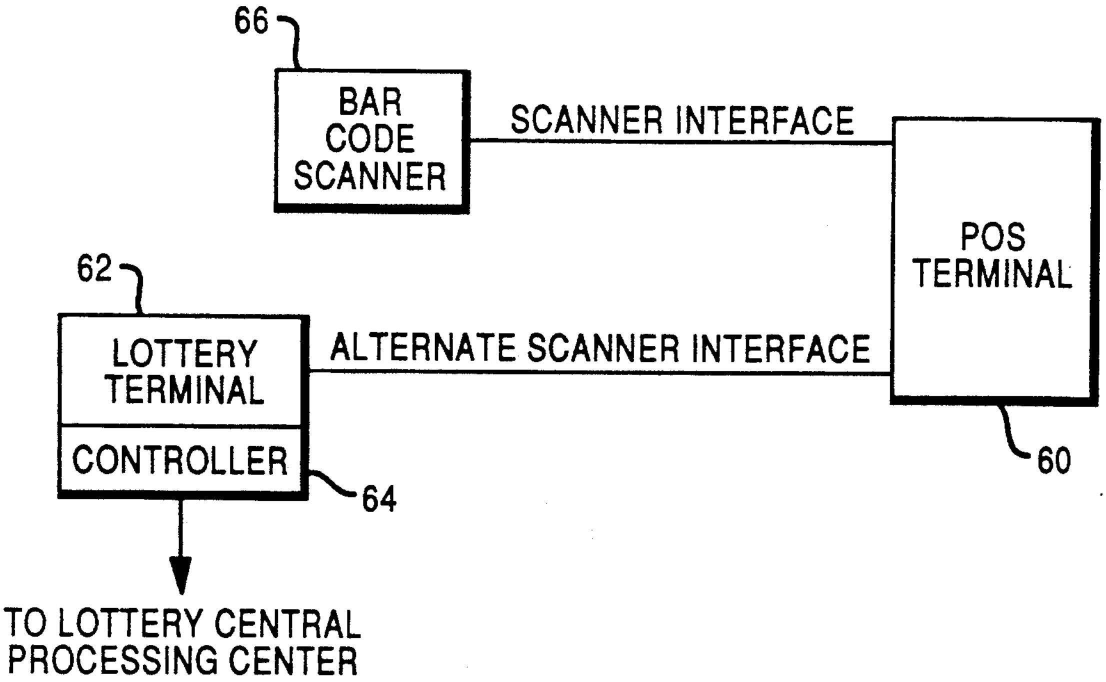
FIG. 2 is a block diagram similar to FIG. 1, in which the POS terminal has two scanner interfaces, with the bar code scanner being coupled to one scanner interface and the lottery terminal being coupled to the other scanner interface.

Shown in FIG. 2 is an alternative combination of a POS terminal 60, a lottery terminal 62 with integral lottery controller 64 and a bar code scanner 66. In this embodiment, a POS terminal is used which is provided with two scanner interfaces, so that the bar code scanner 66 can be coupled directly to the POS terminal 60, as can the lottery terminal 62. It is accordingly not necessary for the lottery terminal 62 to perform any passthrough function with respect to the information from the scanner 66. The arrangement is otherwise similar to that of FIG. 1, with the lottery controller being coupled to the lottery central processing center.

Figure 3:
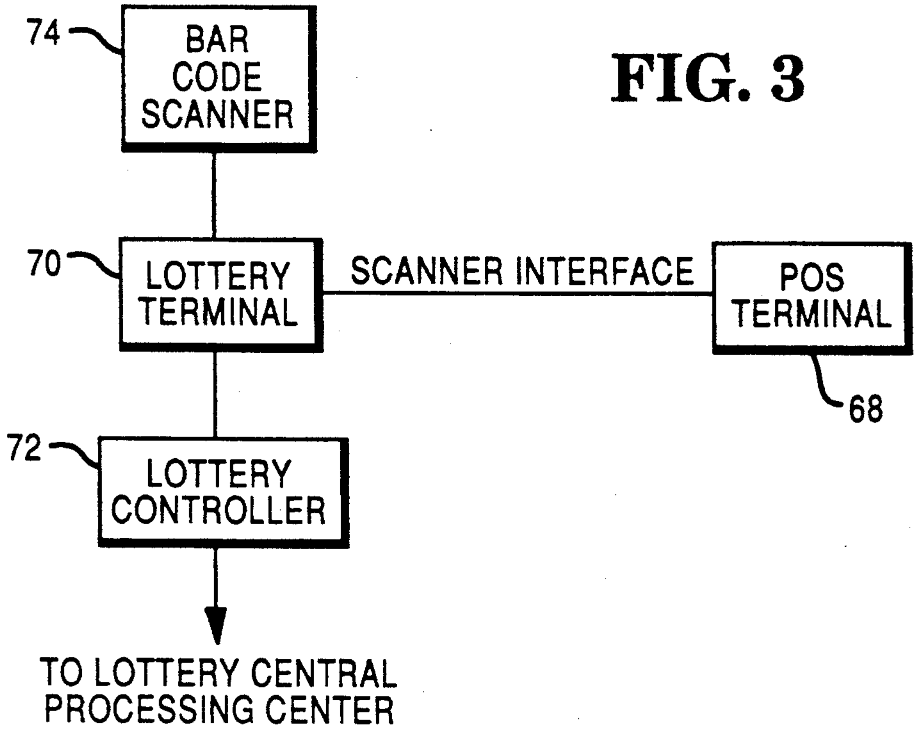
FIG. 3 is a block diagram similar to FIG. 1, in which the lottery controller is a separate unit from the lottery terminal.

Shown in FIG. 3 is a further alternative combination of a POS terminal 68, a lottery terminal 70, a lottery controller 72 and a bar code scanner 74. This arrangement is essentially identical to that of FIG. 1, except that the lottery controller 72 is a separate unit, distinct from the lottery terminal 70. This is a more customary arrangement than that of FIG. 1, and would lend itself more readily to the usual configuration in which each lottery controller is coupled to a plurality of lottery terminals.

Figure 7A:
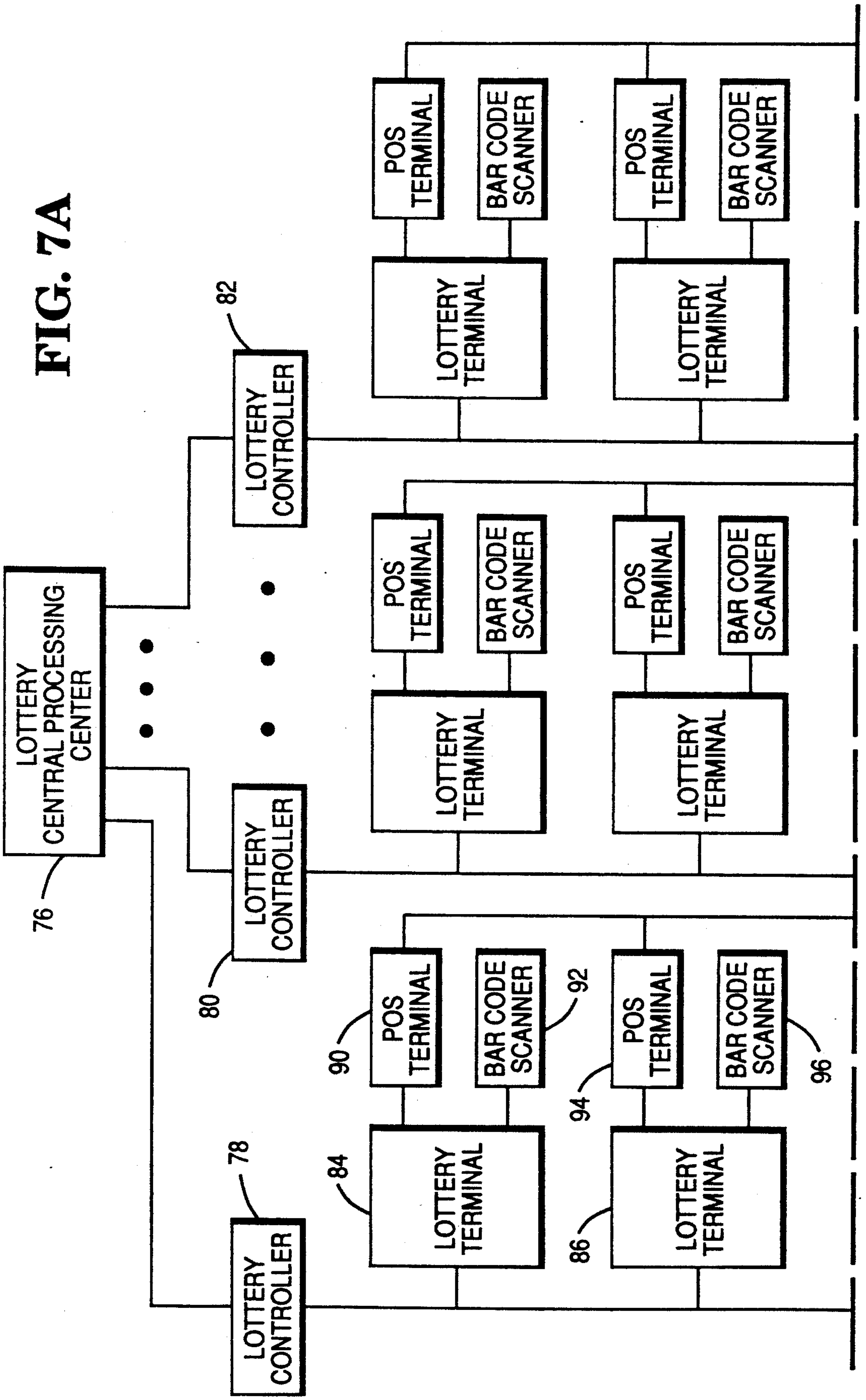
FIGS. 7A and 7B, taken together, constitute a block diagram of a system which includes a lottery central processing center, a plurality of lottery controllers, a plurality of lottery terminals, each having a POS terminal and a bar code scanner associated therewith, and a plurality of in-store processors associated with the POS terminals.
Figure 7B:
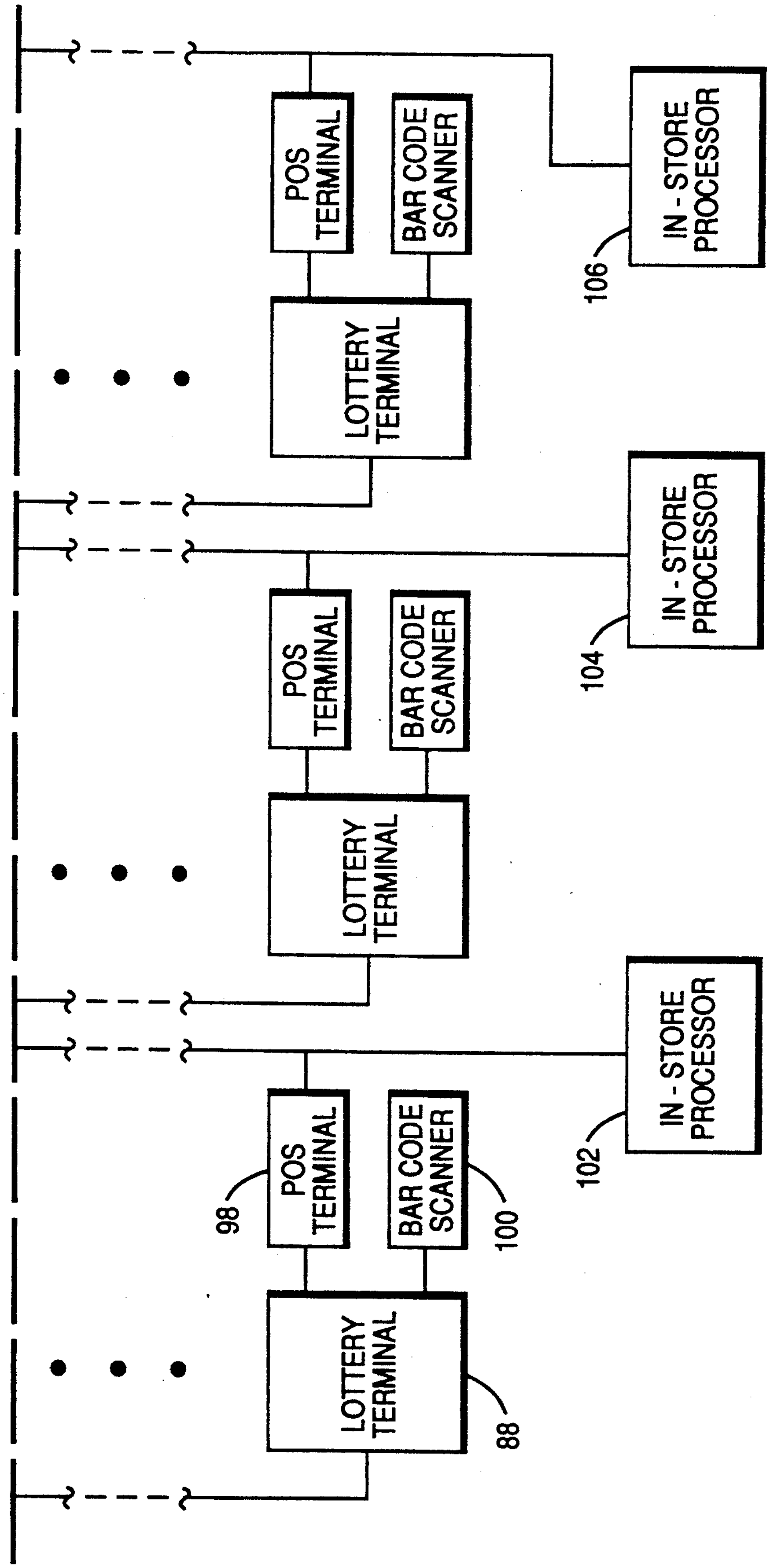

FIGS. 7A and 7B, taken together, constitute a block diagram of an overall configuration of a POS terminal and lottery terminal combination which may be used in a retail establishment to enable the sale of lottery tickets in association with the processing of customer check-out transactions. As shown in FIG. 7A, a plurality of lottery controllers 78, 80 and 82 are coupled to a lottery central processing center 76. A plurality of lottery terminals are coupled to each lottery controller, as illustrated by the lottery terminals 84, 86 and 88 coupled to the lottery controller 78. Coupled to each lottery terminal are a POS terminal and a bar code scanner. Thus the POS terminal 90 and the bar code scanner 92 are coupled to the lottery terminal 84; the POS terminal 94 and the bar code scanner 96 are coupled to the lottery terminal 86; and the POS terminal 98 and the bar code scanner 100 are coupled to the lottery terminal 88. An in-store processor is coupled to all of the POS terminals associated with a given lottery controller. Thus an in-store or transaction processor 102 is coupled to the POS terminals 90, 94 and 98 associated with the lottery controller 78, and POS terminals associated with the lottery controllers 80 and 82 are similarly coupled to in-store processors 104 and 106. It will be understood that other combinations of lottery controllers, lottery terminals, POS terminals, scanners and in-store or transaction processors could be employed, depending upon the requirements for a particular establishment, and that the processor 102 would not necessarily have to be located within the establishment. It will also be understood that other types of scanning devices than bar code scanners could be employed, depending upon the requirements of the system.

When a lottery terminal is activated for ticket purchase, it sends a request to its associated lottery controller, which in turn forwards the request to the lottery central processing center. The following lottery ticket request message format may be used: S T TN S1 D1 S2 D2 . . . SN DN, where S—Sequence Number. Enables message tracking.

T—Transaction Type. Identifies the type of transaction, i.e. Ticket Request.

TN—Terminal Number. Identifies which terminal is requesting the ticket.

S1—Selection 1. Identifies the first selection of the message, e.g., Super Lotto.

D1—Duration 1. Indicates the number of games that selection 1 is to be played.

S2—Selection 2. Identifies the second selection of the message.

D2—Duration 2. Indicates the number of games that selection 2 is to be played.

SN—Identifies selection n of the message.

DN—Duration n. Identifies the number of games that selection n is to be played.

Upon receipt of the message, the lottery central processing center logs the request and assigns a serial number to the transaction. This serial number is returned to the requesting terminal via the lottery controller in an acknowledgement message. The format of the lottery ticket acknowledgement message may be as follows: S T TN S1 S2 . . . SN S/N, where:

S—Sequence Number. Enables message tracking.

T—Transaction Type, i.e. Ticket Acknowledgement.

TN—Terminal Number. Identifies which terminal is to receive the ticket acknowledgement.

S1—Selection 1. Identifies selection 1 and the number being wagered on.

S2—Selection 2. Identifies selection 2 and the number being wagered on.

SN—Selection N. Identifies selection number N and the number being wagered on.

S/N—Serial Number. Unique number assigned to the ticket. Used to process claim.

When the lottery terminal receives the lottery ticket acknowledgement message, it then sends a message to the POS terminal to register the ticket purchase. The lottery terminal then prints the ticket. The message sent by the lottery terminal to the POS terminal will be in the same format as the messages sent by the scanner to the POS terminal, and may typically be in a bar code format.

The following format is one which may be used by a bar code scanner to transmit Universal Product Code (UPC) type A bar code data from the bar code scanner to the POS terminal:

A N X1 X2 X3 X4 X5 X6 X7 X8 X9 X10 C, where:

A—Tag Identifier. Identifies the type of bar code data, i.e. UPC type A.

N—Number System Character. Range 0 through 9.

X1 through X10—Ten digits of bar code data.

C—Check Character. Used for error correction.

The following format closely resembles the above bar code format and is used by the lottery terminal to transmit data to the POS terminal:

A N X1 X2 X3 X4 X5 X6 X7 X8 X9 X10 C, where:

A—Tag Identifier. This is the same as for the normal bar code which is read.

N—As in the code above, this refers to the class of product. It would probably would not be unique for the lottery ticket application. For example, type 0 could be used, which is commonly used for groceries.

X1 through X10—These ten digits would be dedicated to lottery ticket information, such as the number of wagers.

C—Check Character. Used for error detection.

Figure 8:
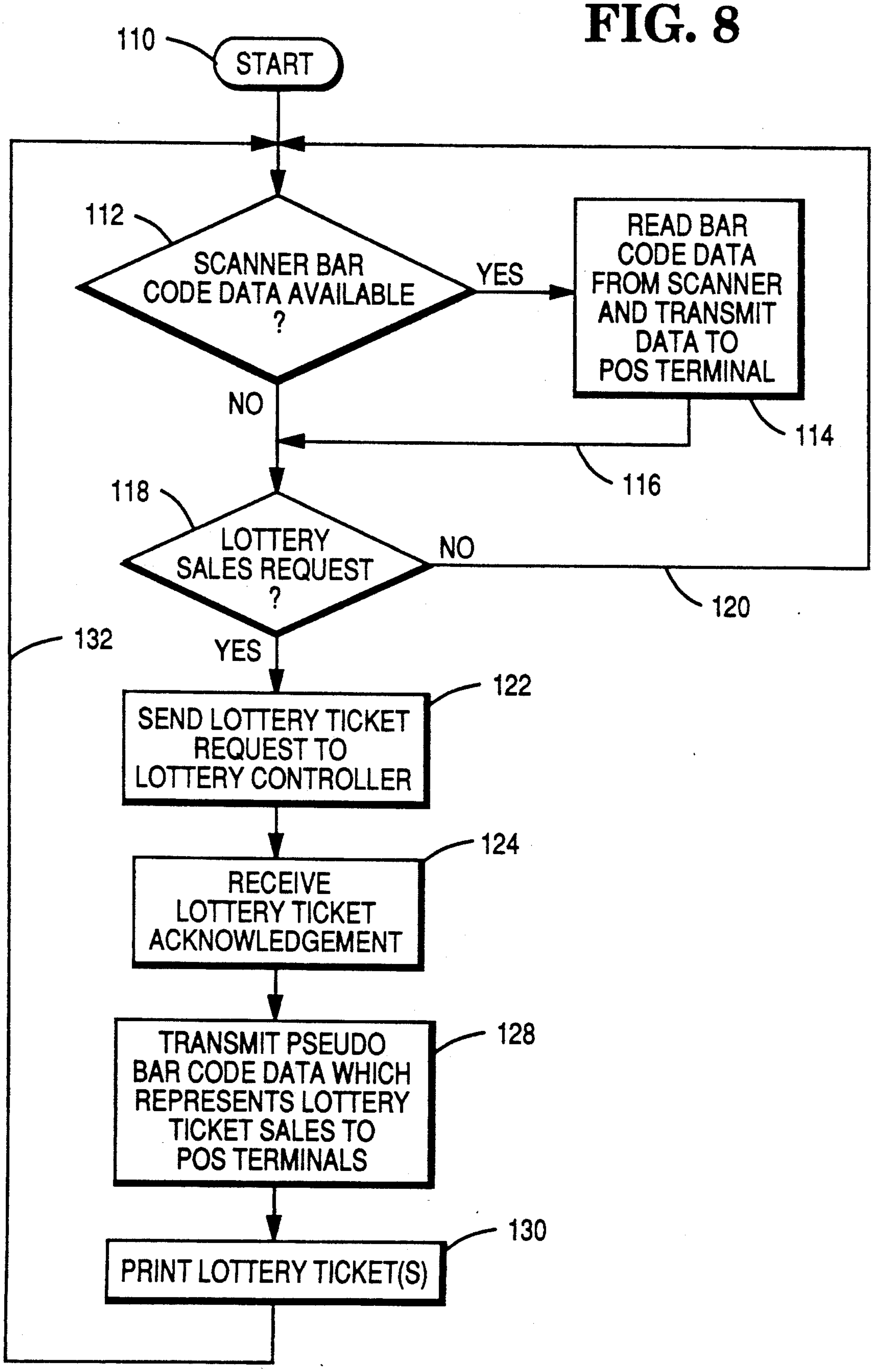
FIG. 8 is a flow diagram showing the functioning of the system which includes the lottery controller, the lottery terminal, the bar code scanner and the POS terminal.

FIG. 8 is a flow diagram showing the manner in which a lottery terminal functions during a lottery ticket transaction, and commences with the "start" block 110. In its operation, the lottery terminal, such as terminal 70 in FIG. 3, first determines whether or not bar code data is available from its associated scanner 74, as represented in block 112. If not, the process continues to block 118, in which a determination is made as to whether or not a lottery sales request has been made at the lottery terminal by a customer. If bar code data is available, the bar code data is read from the scanner and transmitted to the POS terminal 68, after which the process continues over path 116 to the block 118. If there is no lottery sales request at this time, the process returns to the block 112 over the path 120.

If a lottery sales request is noted, the lottery ticket request is sent to the lottery controller 72, as represented in block 122, and from there to the lottery central processing center. An acknowledgement is then received from the lottery central processing center, as represented by the block 124. Once the lottery ticket acknowledgement has been received, the lottery terminal transmits pseudo bar code data which represents lottery ticket sales to the associated POS terminal, as represented by block 128. Following this, the appropriate number of lottery tickets are printed (block 130) and the process returns over path 132 to the block 112.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

What is claimed is:

1. A system for performing both lottery ticket transactions and merchandise sales transactions and for maintaining a record of all such transactions, comprising:

a plurality of lottery terminals;

a plurality of POS terminals for registering both lottery ticket transactions and merchandise transactions, each coupled to a lottery terminal for receiving data from said lottery terminal;

a plurality of scanners, each coupled to a lottery terminal for providing merchandise data to an associated POS terminal through the lottery terminal to which it is coupled;

a lottery controller coupled to all of said lottery terminals; and a transaction processor coupled to all of said POS terminals.

2. The system of claim 1 in which each of said lottery terminals includes control logic means, means to transmit signals generated by a scanner coupled thereto to a POS terminal coupled thereto, and also includes means to transmit signals generated by said lottery terminal to said POS terminal coupled thereto.

3. The system of claim 2 in which the scanner is a bar code scanner, in which the signals generated by the scanner are in a predetermined bar code format, and in which the signals generated by said lottery terminal and transmitted to said POS terminal coupled thereto are also in said predetermined bar code format.

4. The system of claim 2 in which each of said POS terminals includes control logic means, first interface means coupled to said control logic means, for receiving signals from the lottery terminal to which it is coupled, and second interface means coupled to said control logic means, for communicating with the transaction processor to which it is coupled.

5. A system for performing both lottery ticket transactions and merchandise sale transactions and for maintaining a record of all such transactions, comprising:

a lottery central processing center;

a plurality of lottery controllers each coupled to the lottery central processing center;

a group of lottery terminals coupled to each lottery controller;

a POS terminal for registering both lottery ticket transactions and merchandise transactions coupled to each lottery terminal of each group for receiving data from said lottery terminal;

a scanner coupled to each lottery terminal of each group for providing merchandise data to an associated POS terminal through the lottery terminal to which it is coupled; and a plurality of transaction processors, each transaction processor being coupled to all of the POS terminals associated with one group of lottery terminals.

6. The system of claim 5 in which each of said lottery terminals includes control logic means, means to transmit signals generated by a scanner coupled thereto to a POS terminal coupled thereto, and also includes means to transmit signals generated by said lottery terminal to said POS terminal coupled thereto.

7. The system of claim 5 in which the scanner is a bar code scanner, in which the signals generated by the scanner are in a predetermined bar code format, and in which the signals generated by said lottery terminal and transmitted to said POS terminal coupled thereto are also in said predetermined bar code format.

8. The system of claim 5 in which each of said POS terminals includes control logic means, first interface means coupled to said control logic means, for receiving signals from the lottery terminal to which it is coupled, and second interface means coupled to said control logic means, for communicating with the transaction processor to which it is coupled.

9. A system for performing lottery ticket transactions and merchandise sale transactions in an establishment and for maintaining a combined record of both types of transactions, comprising:

a scanner for scanning coded symbols on merchandise purchased and presenting information read from said symbols in a predetermined format at an output of said scanner;

a POS terminal for recording merchandise transactions, said terminal having a scanner interface for receiving information in said predetermined format; and a lottery terminal coupled to said POS terminal through said scanner interface and itself having a scanner interface to which said scanner is coupled, said lottery terminal being capable of transmitting information in said predetermined format from said scanner to said scanner interface of said POS terminal to cause said POS terminal to perform a transaction relating to information scanned by said scanner, and also being capable of providing information relating to lottery transactions in said predetermined format to said scanner interface of said POS terminal to cause said POS terminal to perform a transaction related to the operation of said lottery terminal.

10. The system of claim 9 in which said POS terminal includes control logic, a scanner interface coupled to said control logic and an interface to an in-store processor coupled to said control logic.

11. The system of claim 9 in which said lottery terminal includes control logic, a display coupled to said control logic, a keyboard coupled to said control logic, a lottery ticket printer coupled to said control logic, a lottery controller interface coupled to said control logic, a POS terminal scanner interface coupled to said control logic and a code scanner interface coupled to said control logic.

12. The system of claim 9 in which the scanner is a bar code scanner, in which the information provided by the scanner is in a bar code format, and in which the information relating to lottery transactions provided by the lottery terminal to the scanner interface of the POS terminal is in a pseudo bar code format.

13. A system for performing both lottery ticket transactions and merchandise sale transactions and for maintaining a record of all such transactions, comprising:

a POS terminal having first and second scanner interfaces;

a scanner coupled to one of said interfaces; and a lottery terminal coupled to the other of said interfaces;

whereby said POS terminal is capable of receiving merchandise sale transaction information from said code scanner through said one of said interfaces, and is capable of receiving lottery ticket transaction data from said lottery terminal through said other of said interfaces.

14. The system of claim 13, also including a lottery controller associated with said lottery terminal.

15. The system of claim 14 in which said lottery controller is coupled to and integral with said lottery terminal.

16. The system of claim 13 in which said code scanner is a bar code scanner, in which the merchandise sale transaction information transmitted through said one interface of said POS terminal is in a predetermined bar code format, and in which the lottery ticket transaction information transmitted through said other interface of said POS terminal is also in said predetermined bar code format.

17. A method for performing lottery ticket transactions and merchandise sale transactions utilizing a lottery terminal, a lottery controller, a POS terminal and a scanner for scanning coded merchandise symbols and for maintaining a combined record of both types of transactions, comprising the following steps:

making a determination by the lottery terminal as to whether or not coded merchandise symbol data is available to be received;

if so, reading the coded merchandise data from the scanner and transmitting the data to the POS terminal;

making a determination by the lottery terminal as to whether or not a lottery sales request has been made to the lottery terminal;

if so, sending a lottery ticket request to the lottery controller;

receiving a lottery ticket acknowledgement by the lottery terminal from the lottery controller;

transmitting data representing a lottery ticket sale to the POS terminal; and printing the lottery ticket representing said lottery ticket sale by said lottery terminal.

18. The method of claim 17 in which the coded merchandise symbol data is in a bar code format, and in which the data representing a lottery ticket sale is in a pseudo bar code format.

19. The method of claim 17 in which an in-store processor coupled to the POS terminal is utilized, also including the step of transmitting merchandise data and lottery ticket sale data to said in-store processor.

20. The method of claim 17 in which a lottery control processing center coupled to the lottery controller is utilized, also including the steps of sending the lottery ticket request from the lottery controller to the lottery control processing center; processing said request at said lottery control processing center; and retrieving a lottery ticket acknowledgement from said lottery control processing center to said lottery controller.

* * * * *